Feb. 2, 1937. H. S. PIERCE 2,069,591
DRIVE CHAIN
Filed April 27, 1931 5 Sheets-Sheet 1
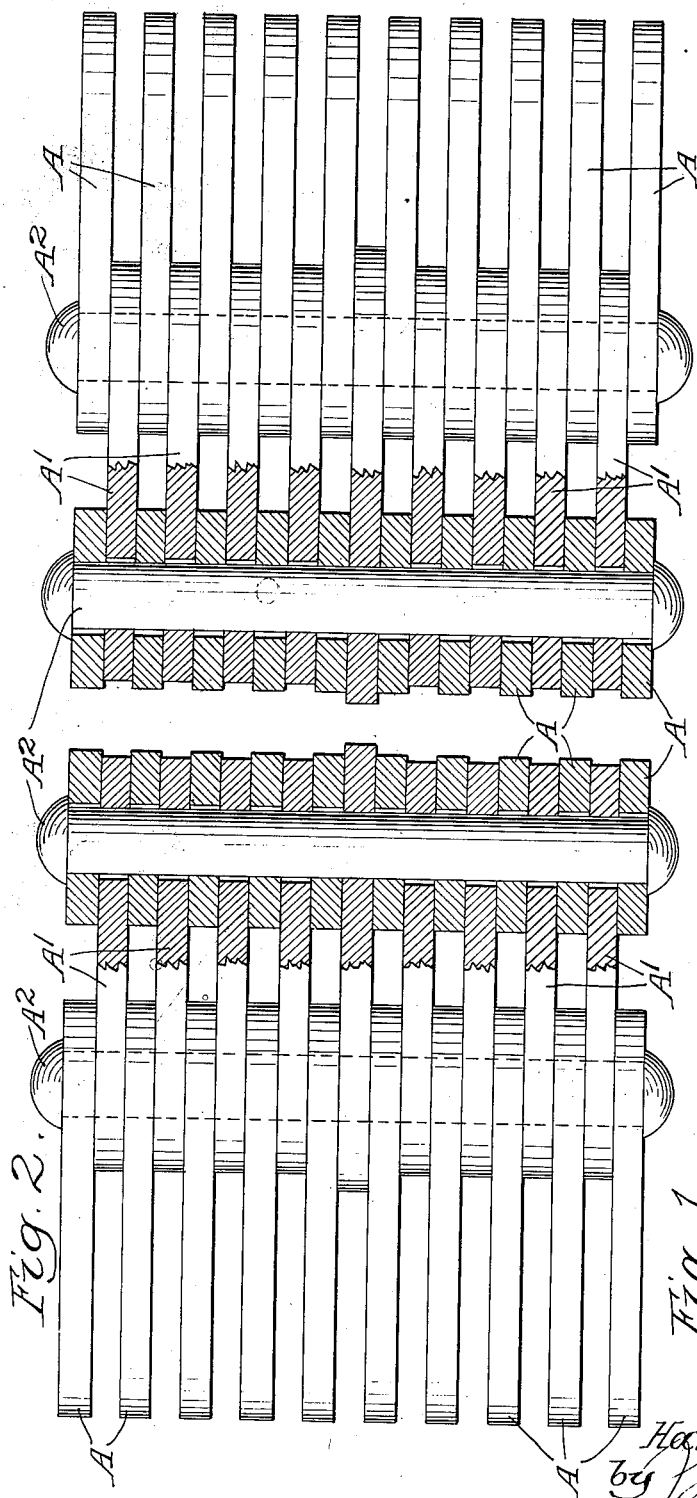
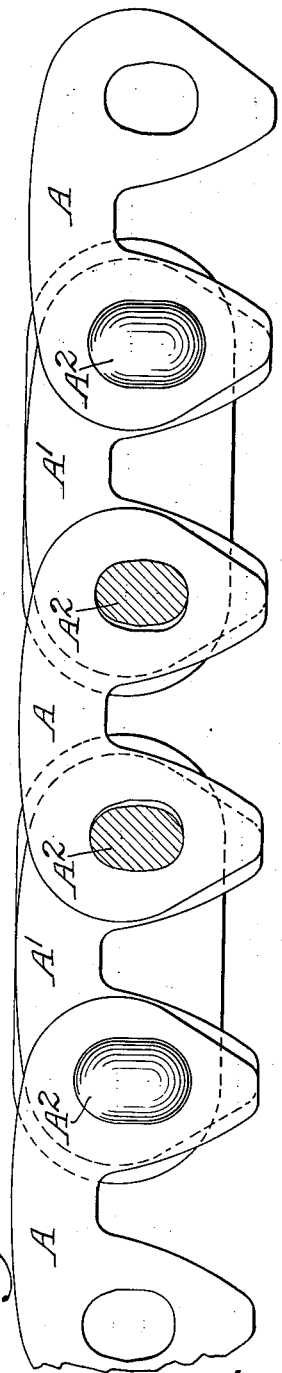
Inventor
Harold S. Pierce
by
Attorneys Feb. 2, 1937. H. S. PIERCE 2,069,591
DRIVE CHAIN
Filed April 27, 1931 5 Sheets-Sheet 3

Inventor
Harold S. Pierce
by Parker & Carter
Attorneys.

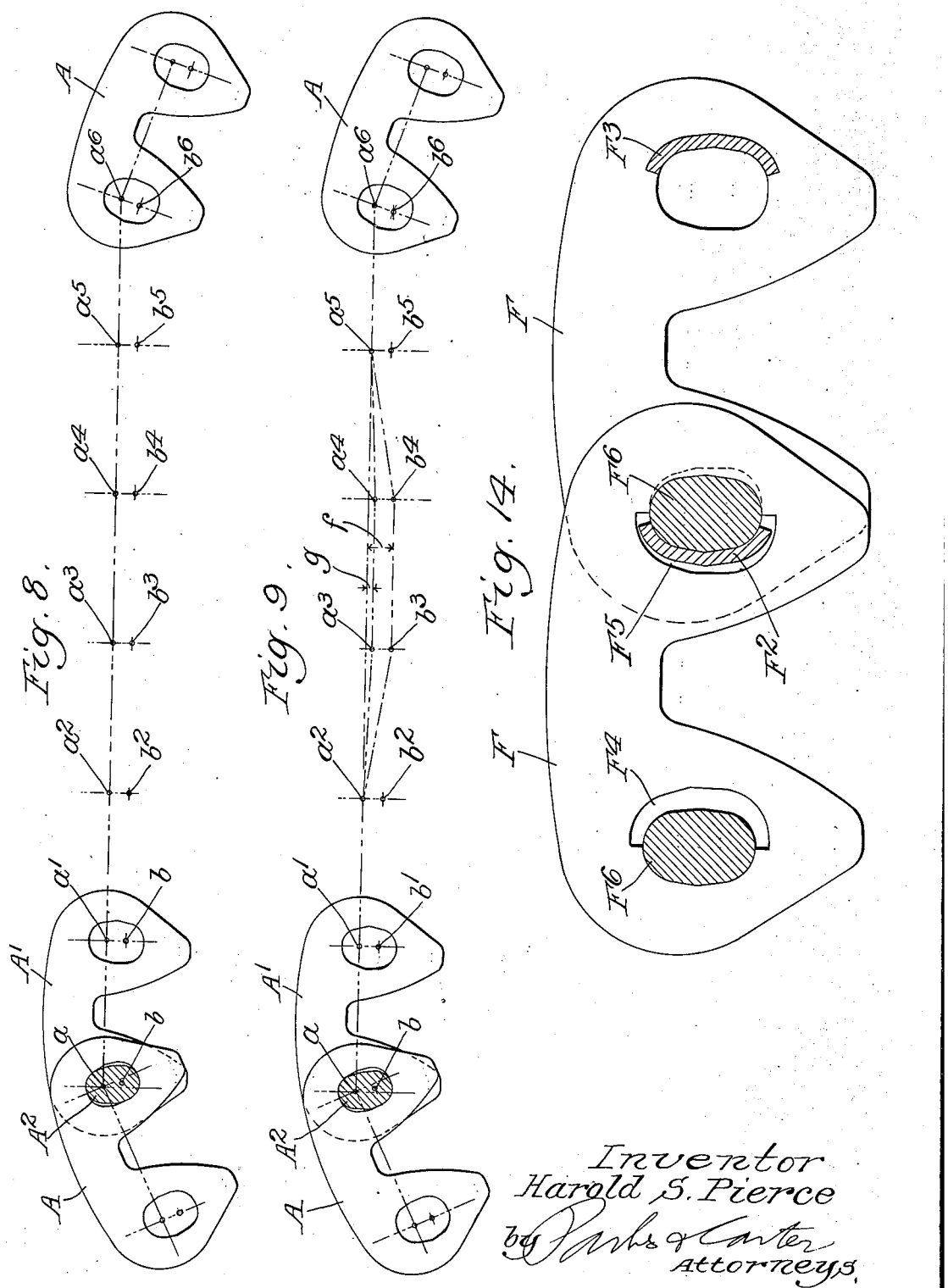

Feb. 2, 1937.   H. S. PIERCE   2,069,591
DRIVE CHAIN
Filed April 27, 1931   5 Sheets-Sheet 5

Inventor
Harold S. Pierce
by
Attorneys

Patented Feb. 2, 1937

2,069,591

UNITED STATES PATENT OFFICE 2,069,591

DRIVE CHAIN

Harold S. Pierce, Indianapolis, Ind., assignor to Link Belt Company, Chicago, Ill., a corporation of Illinois Application April 27, 1931, Serial No. 533,146

9 Claims. (Cl. 74—251)

My invention relates to improvements in drive chains and has for one object to provide a new and improved chain wherein thrash or lateral vibration is reduced to a minimum. Another object is to provide as an essential result of the chain design, yielding means which inevitably and automatically produce an immediate effect upon the chain to resist from its inception any tendency towards movement of the chain between the sprockets over which it travels, along lines perpendicular to its path of travel. Another object is to so arrange and form the chain as to provide means which supplement the aforesaid resisting means to positively stop chain deflection beyond a certain predetermined limit. Another object is to provide a chain wherein a materially increased bearing and load supporting surface is available during the time when the chain is not deflected while at the same time providing a chain whose frictional resistance to deflection as it winds onto or off of a sprocket is reduced to a minimum. Other objects will appear from time to time in the specification and claims.

My invention is illustrated more or less diagrammatically in the accompanying drawings, wherein—

Figure 1 is a side elevation of a piece of chain showing some of the pintle pins in section.

Figure 2 is a plan view of the chain of Fig. 1 showing some of the links in whole or in part in section.

Figures 8 and 9 are diagrammatic showings illustrating the manner in which the double point articulation which is characteristic of my invention assists the tension in the chain to resist lateral deflection or thrash.

Figure 14 is a modified form wherein but a single liner is used with each pin.

Like parts are indicated by like characters throughout the specification and drawings.

My invention is illustrated for the sake of convenience only in connection with a silent chain and so far as we are here concerned the specific relationship between the chain link teeth and the sprocket and the dimensions of chain, sprocket, pintle pin and the like is immaterial and shown merely for the purpose of illustration.

The chain is made up of a series of overlapping toothed chain links A, $A^1$. They are joined in articulating relation with one another by means of a series of noncircular pins $A^2$, which preferably extend clear across the width of the chain and hold the assembled links together, so that the chain may wind onto or off of a sprocket wheel, the chain teeth engaging the sprocket wheel teeth in the usual manner.

The selection of a silent chain of the particular type here selected is for purposes of illustration only. The untoothed links shown in Figure 1 are merely guide links adapted to maintain the chain in alignment on the sprocket wheels and form no part of my invention. $A^3$ is a sprocket about which the chain is wound.

Figure 7:
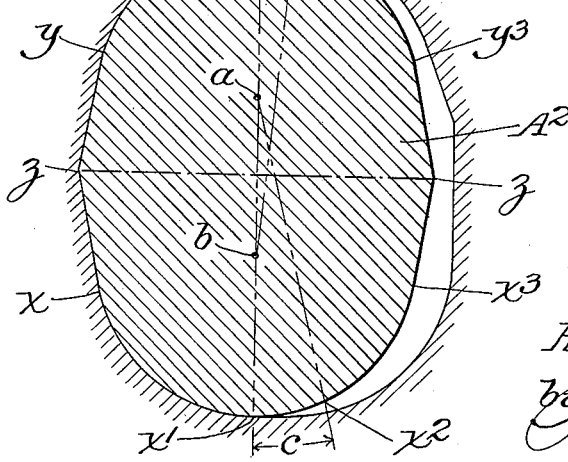
Figure 7 is a diagrammatic enlarged section through the pintle pin showing the outline of the aperture in the link with which it is related.
Figure 10:
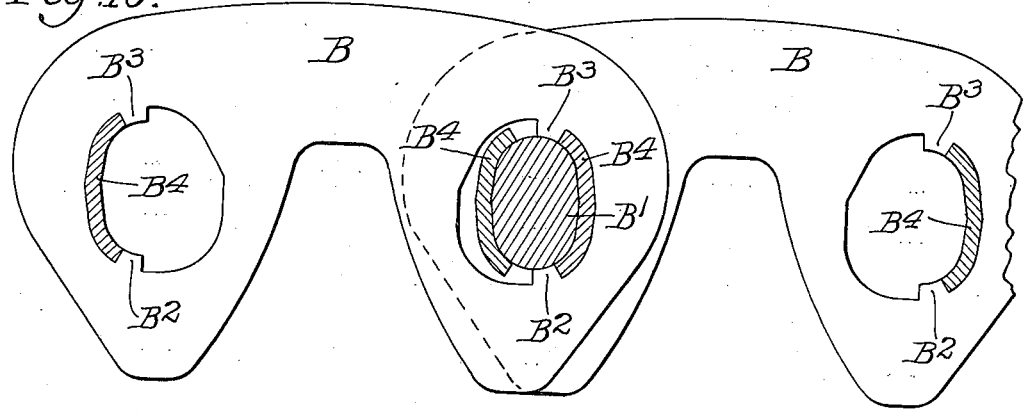
Figure 10 is similar to Fig. 3, but shows a modified form of chain wherein segmental liners are interposed between each pin and its associated links.
Figure 11:
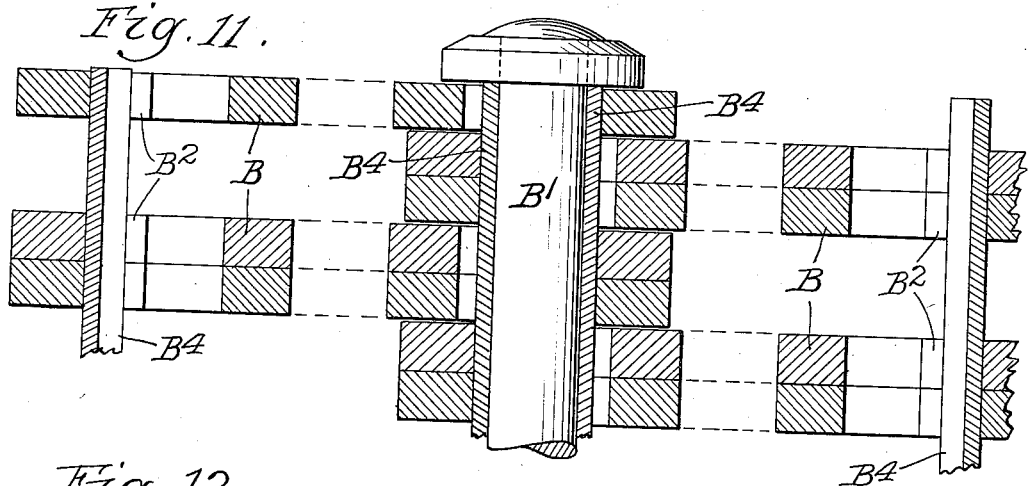
Figure 11 is a section of the chain shown in Fig. 10 with the pintle pin in elevation.

Referring now to the coss section of the pintle pin shown in Figure 7, the line $z$—$z$ is the minor and the line $x^1$—$y^1$ the major axis. The line $z$—$z$ is generally in alignment with the line of normal chain tension between the sprockets. It will be understood that the cross section of the pintle pin is the same throughout its entire length and the pin and hole relationship shown in the drawings and which I am about to describe is simply a satisfactory arbitrarily selected relationship, it being entirely possible to accomplish the purpose which I desire to accomplish in many other ways and by many different designs.

The distance between the points $a$—$b$ which are preferably equidistant from intersection of the lines $x^1$—$y^1$ and $z$—$z$ is arbitrarily selected. Then with the point $a$ as a center, the arc $y$—$y^1$—$y^3$ and with the point $b$ as a center the arc $x$—$x^1$—$x^3$ are described. These arcs are so laid out that the distance $y$—$y^1$ along the curve is the same as the distance $y^1$—$y^3$ and the distance $x$—$x^1$ along the curve is the same as the distance $x^1$—$x^3$ and the distance $y$—$y^1$ along the curve is the same as the distance $x$—$x^1$. The length of these arcs and their radii have been so selected that lines $z$—$y$ and $z$—$y^3$ are tangent to the arc $y$—$y^1$—$y^3$ and the lines $z$—$x$ and $z$—$x^3$ are tangent to the arc $x$—$x^1$—$x^3$ and the lines $x$—$z$ and $y$—$z$ intersect as do the lines $y^3$—$z$ and $x^3$—$z$ to form obtuse angles. The reason for providing this obtuse angular relationship between these lines is that when the pintle pin so formed is in relationship with a link aperture similarly formed as will hereinafter appear then tension on the chain in that part of it between the sprockets tends to cause the pintle pin to seat in a central position in the hole thereby reducing any tendency toward friction properly centering the pin and giving a relatively wide area of link pin contact.

As the chain winds onto a wheel or sprocket, front bend must take place and depending upon the chain pitch, the chain tooth design and the size of sprocket over which the chain is to run, the designer can fix the maximum angle of front bend at each chain pintle. In this case $c$ is the angle of front bend and in order that the chain be not too stiff and may have a certain amount of flexibility it is desirable to design for a certain smaller amount of back bend and the angle $d$ is the angle of back bend selected for each pintle.

Using the point $y^1$ as a center, an arc is struck with radius equal to the distance $y^1$—$a$ to intersect the line $b$—$y^2$. Then with this intersection point as a center, an arc with radius $a$—$y^1$ is struck in continuation of the arc $y$—$y^1$. Using the point $x^1$ as a center, an arc with radius equal to the distance $x^1$—$b$ is laid off to intersect the line $a$—$x^2$. That point of intersection is used as a center for an arc in continuation of the arc $x$—$x^1$, these two arcs extending each of them to the right of Figure 7. The lengths of these arcs are selected such that tangents extending from their termini will intersect at an angle the same as the angle $y^3$—$z$—$x^3$.

The purpose of doing this is to define the size and shape of the apertures such that the pin may rotate in the aperture about either one of the centers $a$ or $b$ and such that the rotation of the pin about the center $a$ may be limited to the angle $c$, and the rotation pin about the center $b$ may be limited to the angle $d$. Sufficient clearance is obtained in the design above pointed out because the extension arcs generally in prolongation of the arcs $y$—$y^1$ and $x$—$x^1$ respectively are on the same radius as the arcs which they prolong although the center about which they are formed is laterally displaced to compensate for the rotation of the pintle in the hole, hence rotation about either one of these center points is brought to a halt when the pin engages the wall of the aperture on the side opposed to its normal position as shown in Figure 7.

The parts having been laid out in this manner we will consider the pintle in Fig. 7 as being pressed by some outside force here not shown toward the left. The link exemplified by the outline of the hole therein being pressed toward the right. This holds the link and pintle in the relative position shown in Fig. 7, the left hand side of the link aperture seated in the left hand side of the hole in the pintle, there being an irregular shaped clearance between the right hand sides of each. If the pintle pin rotates about the center $a$ in the link in a counter-clockwise direction, the surface on the left hand side of the link and aperture will separate and that separation will continue to a maximum at the time when the right hand side of the pin engages the right hand side of the link aperture because the arc $y$—$y^1$—$y^3$ is concentric with the center of rotation $a$ and because the arc $y$—$y^1$ coincides both in the pin and in the link, the link may rotate pivotwise about the center $a$ and because of the way in which the aperture walls are laid out on the right hand side, this rotation is not interfered with by contact between the pin along the arc $y$—$y^3$ and the wall of the aperture, and the pin will tend to roll along the curved surfaces until it has assumed its final right hand position at which point it will be positively stopped. The limiting contacting surfaces when they come together will come together along generally normal lines so no friction or rubbing will take place between the flat surfaces, hence no wearing and no pitch change.

The opposite situation prevails if the pin rotates in a clockwise direction about the center $b$ only in this case the bearing is along the line $x$—$x^1$—$x^3$ and the upper portion of the pin moves toward the right until there is no contact along the line $y$—$y^1$ but there is contact in the vicinity of the line or arc $y^1$—$y^2$—$y^3$ which contact prevents further angular displacement of the pintle with respect to the link. In connection with either of these two motions it will be noted that the tension in the chain which is applied along the line $z$—$z$ and which tends to keep the surfaces $y$, $z$, $x$ on the left hand side of the pin in engagement with and centered in the surfaces $y$, $z$, $x$ on the left hand side of the link aperture will resist rotation of the pin about either the pivot points $a$ or $b$ and the lever arm through which this tension works will be a lever arm equal to one-half the distance $a$—$b$. The parts in the position shown in Fig. 7 being in a position of stability, any motion tending to rotate the pin about the center $a$ or $b$ tends to bodily displace the pin breaking the contact at $x$, $z$, $y$, such force being instantly resisted.

It is of course known that when a violin string is plucked it is deflected outside of the line of tension and the tension in the string tends to return the string itself to a position in alignment between its two supporting points. That is exactly what takes place in connection with my chain, but because deflection of the chain to the right or to the left as the case may be compels clockwise or counter-clockwise rotation of the pintle pin with respect to the length about one or other of the centers $a$ or $b$ the chain tension is given a lever arm through which to work and so more effectively resists lateral deflection. This tension being effective at each pintle point and tending to rotate the link and pin back to the starting position shown in Fig. 7.

In Figures 8 and 9 are illustrated cumulating effect of this resistance to bend. It will be understood that this resistance takes place at and is localized in each link articulation point and so there is this tendency to return each articulated pair of links back to normal and this tendency is illustrated as a tendency applied at the points $b^3$, $b^4$ etc. in Fig. 9.

Referring to Figure 8, the points $a$, through $a^1$ to $a^6$, show the positions of the pintle pivot $a$, as the chain travels in a straight line direction without thrash or deflection under tension from one sprocket to the other. It makes no difference whether geometric line of tension passes through these points or not, that line will be somewhere near them and will be parallel with the line joining these points. Now if as shown in Figure 9, the chain tends to deflect downwardly, this will be accompanied by a rotation of each pintle with respect to the links with which it is associated, the rotation tending to change the relationship shown in Figure 7, and to cause the pintle and link to rotate with respect to one another, about the point $a$, tending to cause the right hand side of the pintle to approach the right hand side of the hole in the link. Now if the distance through which this deflection takes place is shown at $g$, it will be obvious that the lever arm through which force is applied tending to resist this, will be as much greater than $g$, as is the distance between the intersection of the lines $z$—$z$ and $x^1$—$y^1$ and the pivot point $a$ causes the lever arm above referred to tending to resist separation of the surface $x$—$z$—$y$ is equal to the distance between the pivot point $a$, and the intersection point and that distance is represented by the value $f$. The design of the chain is such that at all times the lever arm $f$ is greater than the distance $g$ even up to the point that when the link and pin have rotated through the angle $c$, at which rotation stops.

Chain design is complicated by the fact that the chain is made in very large quantities and commercially must be sold for many different purposes, so ordinarily chain is not designed for one specific use only and all design must be a compromise.

As far as resistance to thrash is concerned, the greater the distance $z$—$b$, the more effective becomes the thrash preventing means, but as the distance $a$—$b$ is increased the radii of the arcs $y$, $y^1$, $y^3$ and $x$, $x^1$, $x^3$ are decreased because in this case the radius would no longer be the distance $a$—$b$, but a distance equal to the distance from the point $a$ or $b$ to the end of the major axis of the cross sectional area of the pintle pin and the shorter this radius, the thinner becomes the pintle pin. A point can be reached, of course, where the pintle pin becomes so thin that it is not strong enough to carry the load. On the other hand, if the distance $a$—$b$ is decreased we tend to approach the conventional type of chain with a cylindrical pintle and the shorter the distance $a$—$b$, the stronger the chain, but the less the resistance to chain thrash. The chain designer is therefore compelled to select more or less arbitrarily the distance $a$—$b$ and fit it into the chain with reference to his link tooth design, his sprocket tooth design and the other features of the chain selected by him for the purpose for which the chain is to be used.

Figure 12:
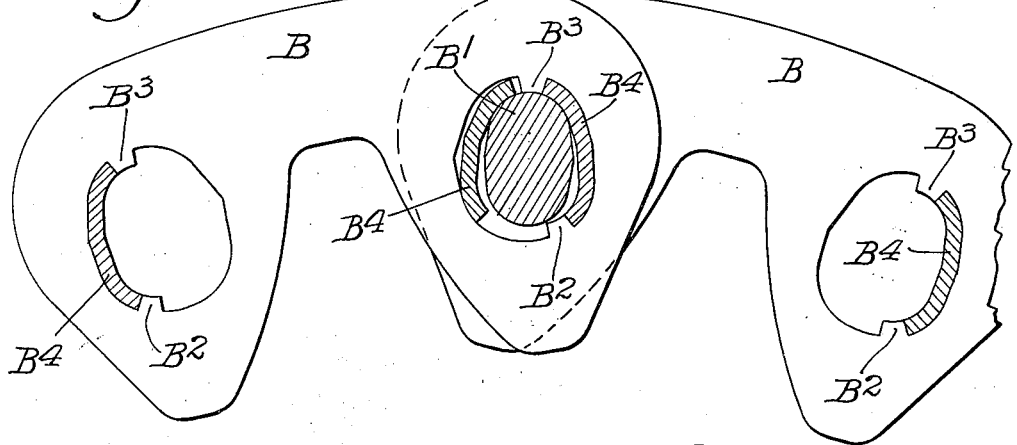
Figure 12 is a view similar to Fig. 10 showing the chain in front bend position.

The modifications shown in Figures 10 to 13 inclusive merely illustrate different forms of chain with which my invention may be used. For instance, in Figures 9, 10 and 11, link $b$ is provided with a pintle pin $b'$. The aperture in the link is divided into two equal segments by the lugs $b^2$ and $b^3$, the outer segment having a liner $b^4$ tightly held therein free to travel in the wider space between the lugs $b^2$ $b^3$ of the adjacent links. In this case the liner tends to tie all the links extending in one direction together. The relationship, however, between the pin and liner and between the liner and link being in effect as that shown in the preferred form. In Figure 12 a further modification is shown. In this case the pin $a^{12}$ being fitted in one length gets its play or freedom to rock from articulation and make its force felt to prevent thrash especially in the adjacent link, the pin $a^{12}$ being fixed in the left hand end of the link $a^{22}$ will be free to oscillate in the aperture $a^{23}$ in the right hand end of the link $a^{21}$, the aperture $a^{24}$ and the link $a^{22}$ being to the aperture $a^{23}$ in the aperture $a^{21}$.

Figure 3:
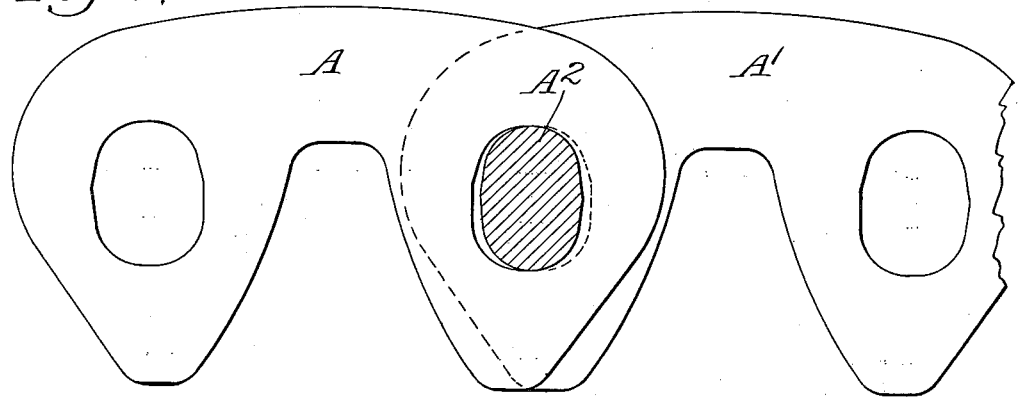
Figure 3 is a side elevation on an enlarged scale of two of the links shown in Fig. 1, the pintle pin in section, the links in the position they would assume with the chain subjected to straight line tension only.
Figure 4:
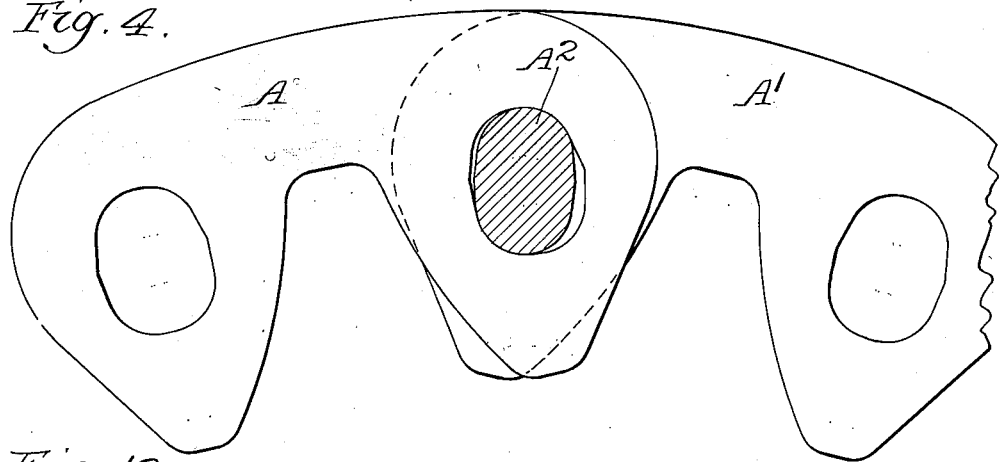
Figure 4 is a view similar to Fig. 3 but with the parts in the position of maximum front bend with the positive stop means effective.
Figure 13:
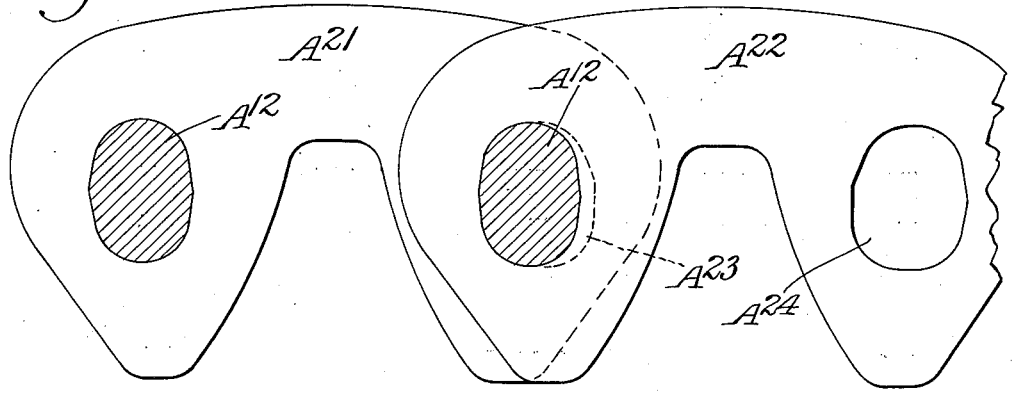
Figure 13 is a view similar to Fig. 3 showing a modified form of chain wherein the pintle pin is rigidly mounted in one of the two links.
Figure 5:
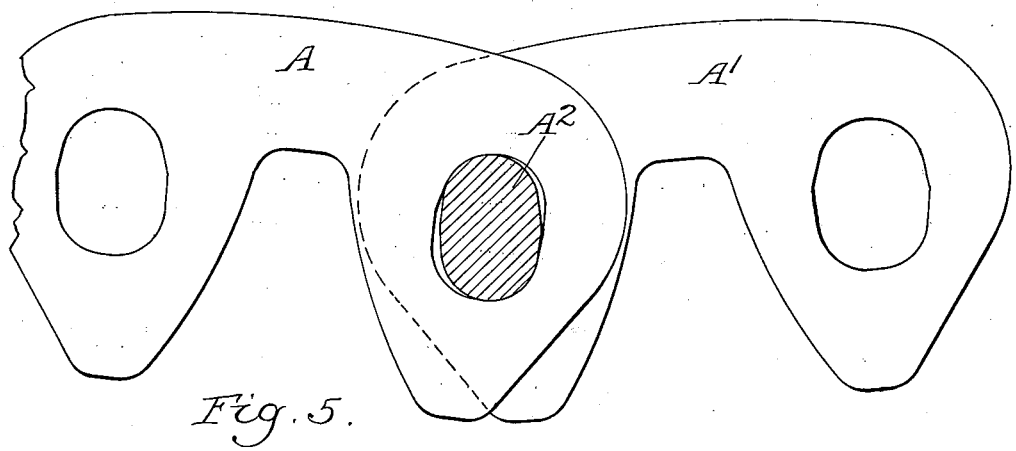
Figure 5 is a similar view to Fig. 3 with the links at the position of maximum back bend.
Figure 6:
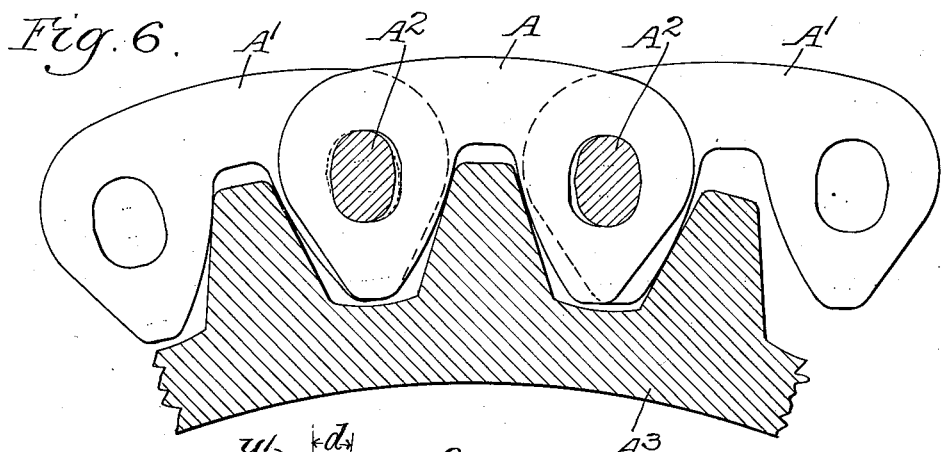
Figure 6 is a sprocket in section with chain in elevation winding upon it the pintle pins in section.

In the modified form shown in Figure 13 every alternate link near $f'$ contains opposed segmental bushings $f^2$ $f^3$, the links $f$ having irregular shaped apertures $f^4$ $f^5$ to permit movement of the bushings $f^2$ $f^3$ associated with the pins $f^6$ so that the articulation and the thrash resisting characteristics are the same but the bushing rather than the link and pin itself takes whatever wear there may be.

All these alternate forms and many others which might be shown, may be applied to silent chain, roller chain, block chain or other chain, but all such forms have the common characteristic, that the articulating relation between the link and the pin is one which is associated with a pair of articulation points or lines (if we consider the whole chain) such articulating points being spaced a greater or less distance apart and being located on opposed sides of the normal line of tension of the chain, so that as chain thrash commences and chain links are given a relatively angular movement at points removed from the sprocket, the tension in the chain is caused to immediately make itself felt through the lever arm representing the distance from the line of tension to one other of the articulation points. In a sense the effect is much like that of the old fashioned rocking chair. The pintle is so formed that it cannot rotate about a central axis with respect to the link, the irregular shape of the pintle and the hole in the link making that impossible. Any angular displacement of the link and the pintle must take place either with the link rotating about one or the other of its centers of rotation and whichever center serves as the fulcrum rotation tends to cause a separation of the surfaces, $x$—$z$—$y$, which separation is resisted by the tension in the chain, just as is the case in the old fashioned rocking chair where there is a flat spot on the rocker.

I claim:

1. A power transmission chain comprising a plurality of articulated apertured tension members, one piece pivot pins upon which they articulate, the major axis of the aperture in the plane of the tension member intersecting the neutral axis of the chain, the minor axis being generally parallel with the neutral axis of the chain, the aperture being bounded at each end by a curved line, each side being formed along two straight lines inclined to each other and tangent to the curved ends the tension line of the chain passing between and never intersecting either of the curved lines bounding the aperture.

2. A power transmission chain comprising a plurality of articulated apertured tension members, one piece pivot pins upon which they articulate, the major axis of the aperture in the plane of the tension member intersecting the neutral axis of the chain, the minor axis being generally parallel with the neutral axis of the chain, the aperture being bounded at each end by a curved line, each side being formed along two straight lines inclined to each other and tangent to the curved ends, the opposed faces of the pivot pins conforming generally to the opposed bounding surface of contour of the apertures and free to rock and slide in the apertures the tension line of the chain passing between and never intersecting either of the curved lines bounding the aperture.

3. A chain comprising a plurality of articulating links apertured at their ends, the apertures on successive links being in line, a pivot pin passing through said apertures and joining the links to form a chain, the apertures being longer in a direction perpendicular to the chain than in a direction parallel with it, the ends of the apertures being bounded by cylindrical surfaces and joined by tangent plane surfaces, which plane surfaces generally intersect the axis of the chain, the opposed faces of the pivot pins conforming generally to the opposed bounding surfaces of the contour of the apertures and free to rock and slide in the apertures.

4. A chain comprising a plurality of articulating links apertured at their ends, the apertures on successive links being in line, a pivot pin passing through said apertures and joining the links to form a chain, the apertures being longer in a direction perpendicular to the chain than in a direction parallel with it, the ends of the apertures being bounded by cylindrical surfaces and joined by tangent plane surfaces, which plane surfaces generally intersect the axis of the chain, the pin conforming generally to the shape of the aperture adapted to rock slightly within the aperture to limit relative angular displacement of the links.

5. A chain comprising a plurality of articulating apertured sprocket engaging members, one piece pivot pins joining them and upon which they articulate, the apertures being bounded at their ends by opposed curved ends and at their sides by inclined straight walls, the pin having straight side surfaces adapted to come into flatwise contact with the straight walls bounding the apertures and conforming generally to the shape of the aperture and adapted to rotate slightly therein the tension line of the chain passing between and never intersecting either of the curved lines bounding the aperture.

6. A chain comprising a plurality of articulating apertured sprocket engaging members, one piece pivot pins joining them and upon which they articulate, the apertures being bounded at their ends by opposed curved ends and at their sides by straight walls inclined to one another, each wall being tangent to the curved wall adjacent thereto, the pin conforming generally to the shape of the aperture and adapted to rotate slightly therein the tension line of the chain passing between and never intersecting either of the curved lines bounding the aperture.

7. In a chain, a plurality of articulated perforate links, a pivot pin upon which they are articulated, the pin having at either side of the line of tension of the chain opposed curved surfaces described about spaced centers, bearing surfaces generally tangent to said opposed surfaces, the apertures of the links having similar bearing surfaces in opposition to the opposed bearing surfaces on the pintle, and curved surfaces joining them upon which the curved surfaces on the pin may travel.

8. In a chain, a pivot pin having a plurality of curved and flat bounding surfaces, a link having an aperture in which the pin is rockably mounted and which is bounded by a plurality of curved and flat surfaces, the curved surfaces on pin and link being in opposition to and adapted to engage one another only, the flat surfaces on pin and link being in opposition to and adapted to engage one another only, the relationship between the flat and curved surfaces being such that as the pin rotates in the link with the curved surfaces of one pair in opposition to one another, one pair of opposed flat surfaces may approach until they contact, whereupon further rotation of the pin and link causes sliding movement with respect to the second pair of curved surfaces as the first pair of curved surfaces separate one from the other until the second pair of flat surfaces come in contact with one another.

9. A chain comprising a plurality of articulating links apertured at their ends, the apertures on successive links being in line, a pivot pin passing through said apertures and joining the links to form a chain, the apertures being longer in a direction perpendicular to the chain than in a direction parallel with it, the ends of the apertures being rounded by cylindrical surfaces and joined by tangent surfaces, which tangent surfaces generally intersect the axis of the chain.

HAROLD S. PIERCE.